United States Patent [19]
Poworoznek

[11] Patent Number: 5,823,700
[45] Date of Patent: Oct. 20, 1998

[54] DRAWER FRONT FASTENER

[75] Inventor: Robert C. Poworoznek, Jamestown, N.Y.

[73] Assignee: Bush Industries, Inc., Jamestown, N.Y.

[21] Appl. No.: 710,672

[22] Filed: Sep. 18, 1996

[51] Int. Cl.⁶ .............................. F16B 12/24; A47B 88/00
[52] U.S. Cl. .................. 403/245; 403/407.1; 403/405.1
[58] Field of Search .............. 403/405.1, 406.1, 403/407.1, 348, 245

[56] References Cited

U.S. PATENT DOCUMENTS

| | | | |
|---|---|---|---|
| 2,588,609 | 3/1952 | Blackhall | 403/348 X |
| 3,908,330 | 9/1975 | Frach et al. | 403/348 X |
| 3,967,432 | 7/1976 | Starr . | |
| 4,394,101 | 7/1983 | Richer | 403/348 X |
| 4,518,278 | 5/1985 | Koch . | |
| 4,589,710 | 5/1986 | Röck et al. . | |
| 4,609,236 | 9/1986 | Twellmann . | |
| 4,690,469 | 9/1987 | Grass . | |
| 4,741,583 | 5/1988 | Röck et al. . | |
| 4,775,202 | 10/1988 | Röck et al. . | |
| 4,815,798 | 3/1989 | Röck et al. . | |
| 4,832,420 | 5/1989 | Röck et al. . | |
| 4,846,538 | 7/1989 | Röck et al. . | |
| 4,850,659 | 7/1989 | Röck et al. . | |
| 4,869,564 | 9/1989 | Lechman | 403/407.1 X |
| 4,874,212 | 10/1989 | Röck et al. . | |
| 4,902,080 | 2/1990 | Berger . | |
| 4,961,614 | 10/1990 | Röck . | |
| 4,995,683 | 2/1991 | Albiez . | |
| 5,028,189 | 7/1991 | Harley . | |
| 5,076,723 | 12/1991 | Berger . | |
| 5,147,124 | 9/1992 | Grass et al. . | |
| 5,154,385 | 10/1992 | Lindberg et al. . | |
| 5,222,791 | 6/1993 | Held et al. . | |
| 5,281,022 | 1/1994 | Röck . | |
| 5,348,386 | 9/1994 | Grass . | |
| 5,364,181 | 11/1994 | Scheible . | |
| 5,375,923 | 12/1994 | Hall et al. . | |
| 5,505,554 | 4/1996 | Lautenschläger et al. . | |

FOREIGN PATENT DOCUMENTS

| | | | |
|---|---|---|---|
| 2599096 | 11/1987 | France | 403/405.1 |
| 2546749 | 4/1977 | Germany | 403/407.1 |

Primary Examiner—Anthony Knight
Attorney, Agent, or Firm—Webb Ziesenheim Bruening Logsdon Orkin & Hanson, P.C.

[57] ABSTRACT

A quick-release fastener assembly detachably and adjustably couples a drawer front and a drawer body. The fastener assembly includes a tightening fastener rotatably positioned within the drawer body, a fastening rod extending between the drawer front and the drawer body, and a base housing mounted within the drawer body. The fastening rod includes a head portion at one end detachably connected to the tightening fastener and a substantially T-shaped tail portion at an opposite end for attaching the fastening rod to the base housing. The T-shaped tail portion is received within a slot of the base housing and the fastening rod is rotated relative to the base housing to a secured position to secure the fastening rod to the base housing.

18 Claims, 3 Drawing Sheets

DRAWER FRONT FASTENER

BACKGROUND OF THE INVENTION

1. Field of the Invention

The present invention relates to fastener assemblies and, more particularly, to a quick-release fastener assembly for detachably and adjustably coupling a drawer front and drawer body.

2. Description of the Prior Art

Connecting assemblies which facilitate the attachment of two perpendicular panels have become popular for detachably connecting a drawer front to a drawer body. Typical connecting assemblies include a rotatable tightening bolt positioned within the drawer body which detachably receives a fastening rod secured to the drawer front. The fastening rod includes a head which is received by a camming surface of the tightening bolt such that, upon rotation of the tightening bolt, the fastening rod and drawer front are drawn inward against the drawer body. Early connecting assemblies of this type provided no mechanism for adjusting the orientation of the drawer front relative to the drawer body. Attempts have been made to overcome these drawbacks by providing a connecting assembly which allows for relative movement between the fastening rod and a base housing connecting the fastening rod to the drawer front. Such a drawer front attachment system is disclosed in U.S. Pat. No. 5,375,923 to Hall et al.

The Hall et al. '923 drawer front attachment system provides that the fastening rod is threadably connected to the base housing by a fastening nut within the base housing. The fastening nut is attached to the base housing by frangible connectors until the fastening rod is threaded thereto. Upon threading of the fastening rod to the fastening nut, the frangible connections between the fastening nut and the base housing are broken allowing relative movement between the fastening rod and the base housing. U.S. Pat. No. 5,028,189 to Harley discloses a similar attachment mechanism having a nut with frangible connectors. These prior art arrangements suffer from a variety of drawbacks. The manufacture of the base housing, fastening nut and frangible connectors therebetween is complicated. Furthermore, an increased assembly time results from the threading attachment of the fastening rod to the fastening nut and the subsequent breaking of the connectors between the nut and the base housing. Furthermore, after the frangible connectors between the nut and the base housing have been broken, it becomes difficult to detach the fastening rod from the base housing, if desired.

It is an object of the present invention to overcome all of the aforementioned drawbacks of the prior art. It is a further object of the present invention to provide a quick-release fastener assembly f or detachably and adjustably coupling a drawer front and a drawer body which is quick, easy and cost-effective to manufacture and assemble.

SUMMARY OF THE INVENTION

The above-described objects are achieved by a fastener assembly according to the present invention which detachably and adjustably couples a drawer front and drawer body. The fastener assembly of the present invention includes a tightening fastener rotatably positioned within the drawer body and a fastening rod extending between the drawer body and the drawer front. The fastening rod includes a head portion at one end thereof which is adapted to be detachably connected to a rotatable tightening fastener. The fastening rod further includes a substantially T-shaped tail portion at an opposite end of the fastening rod. A base housing is mounted within the drawer body with the base housing having a slot therein adapted to receive the tail portion of the fastening rod therethrough. The fastening rod is adapted to rotate relative to the base housing to a secured position to secure the fastening rod to the base housing after receipt of the tail portion within the slot. When in the secured position, at least a portion of the tail portion will overlap a portion of the base housing to maintain a secure attachment between the fastening rod and the base housing.

One embodiment of the present invention provides that the base housing includes a substantially cylindrical peripheral wall and a substantially planar face member at one end of the peripheral wall with the slot extending through the face member. The slot may include a substantially circular center portion with a pair of diametrically opposed rectangular portions extending from the center portion. The base housing may further include a pair of stop members extending radially inward from the peripheral wall with each stop member aligned with one of the rectangular portions of the slot. The base housing may further include a pair of diametrically opposed openings in the peripheral wall with each peripheral wall opening capable of receiving a portion of the tail portion therethrough when the fastening rod is in the secured position. Additionally, the base housing may further include a pair of arcuate stopping ridges extending radially inward from the peripheral wall with each of the stopping ridges aligned with one of the peripheral wall openings and a plurality of locking projections extending radially inward from the peripheral wall with each locking projection extending from the face member to one stopping ridge adjacent a side edge of one peripheral wall opening. Mutually engaging teeth members may be provided on a portion of the tail portion and the face member to further secure the fastening rod to the base housing when the fastening rod is in a secured position and the tightening fastener has positioned the fastener assembly in a locked position.

These and another objects of the present invention will be clarified in the description of the preferred embodiment taken together with the attached figures wherein like reference numerals represent like characters throughout.

BRIEF DESCRIPTION OF THE PREFERRED EMBODIMENT

Figure 1:
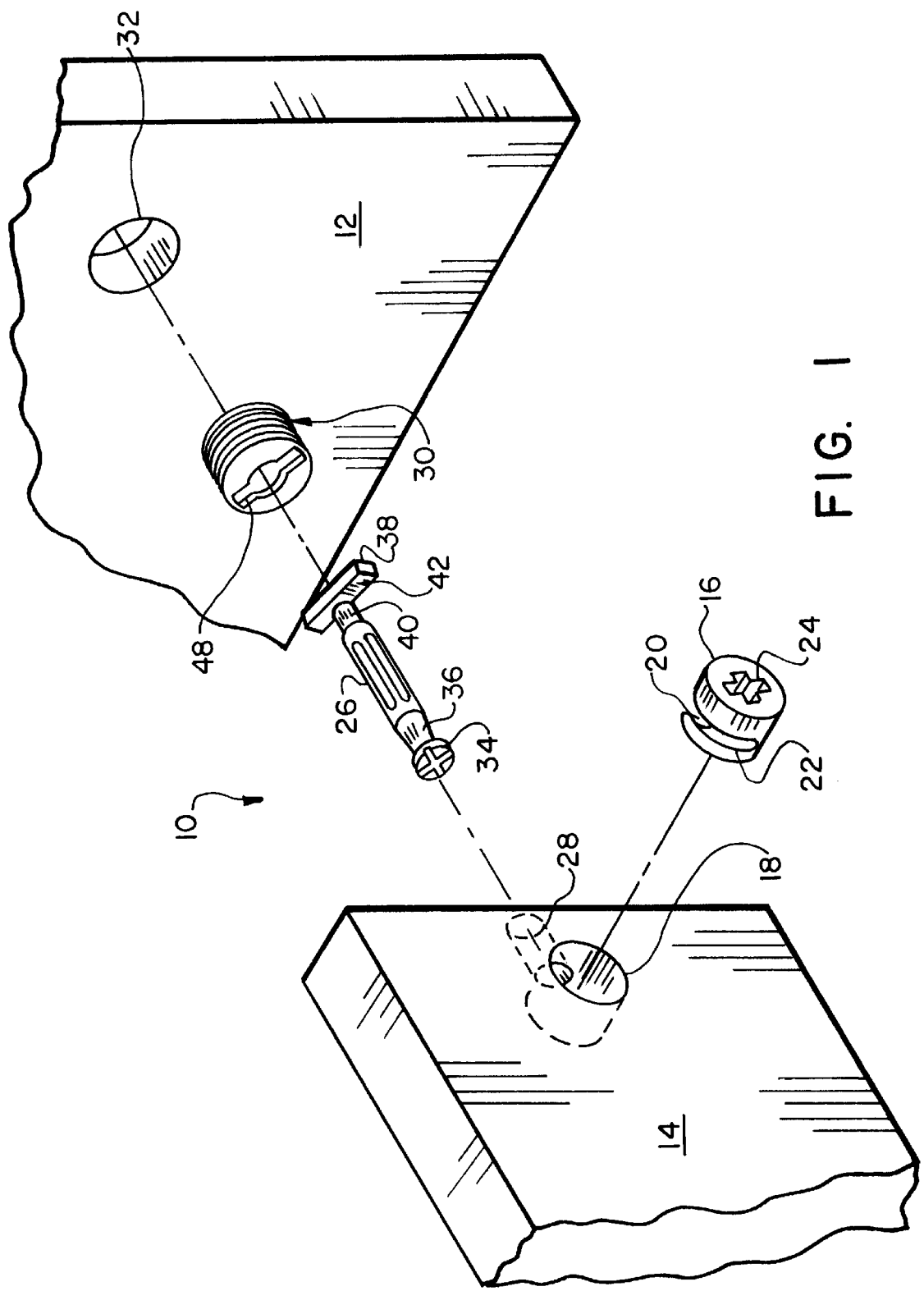
FIG. 1 is a perspective view of the drawer front fastener assembly according to the present invention.
Figure 2:
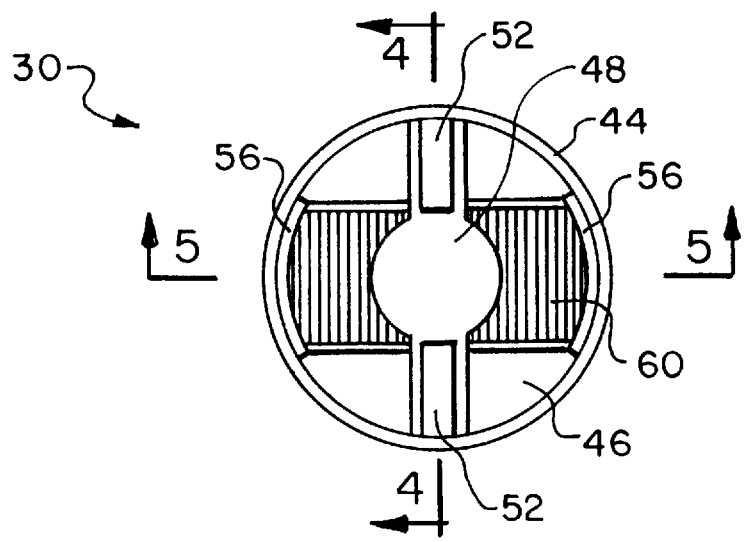
FIG. 2 is a plan view of a base housing of the drawer front fastener assembly illustrated in FIG. 1.

FIG. 1 illustrates a drawer front fastener assembly 10 for detachably and adjustably coupling a drawer front 12 to a drawer body 14.

A rotatable tightening fastener 16 is rotatably positioned within a bore 18 in the drawer body 14. The tightening fastener 16 includes an arcuate groove or slot 20 with camming surfaces 22 adjacent the groove 20. A connection 24 for a Phillips head screwdriver, regular screwdriver, allen wrench or the like is provided on the front face of the tightening fastener 16 to assist in the rotation of the tightening fastener 16 within the bore 18.

A fastening rod 26 extends between the drawer body 14 and the drawer front 12. The fastening rod 26 extends from bore 18 through longitudinal bore 28 to a base housing 30 which is secured in a blind bore 32 within the drawer front 12. The fastening rod 26 includes a head portion 34 at one end thereof positioned adjacent a reduced diameter neck 36. The head portion 34 is detachably connected to the tightening fastener 16 by being received within the groove 20. The fastening rod 26 includes a substantially T-shaped tail portion at an opposite end of the fastening rod 26. The T-shaped tail portion is formed by a substantially rectangular-shaped elongate member 38 which extends substantially transverse to the longitudinal axis or length of the fastening rod 26. The elongate member 38 is positioned on top of a reduced diameter portion 40. The elongate member 38 includes a plurality of teeth members 42 on a surface of the elongate member 38 facing the head portion 34. The T-shaped tail portion will secure the fastening rod 26 to the base housing 30 as will be described hereinafter. The fastening rod 26 may additionally include material-saving recesses along the length thereof to decrease manufacturing costs as is known in the art.

The base housing 30 is shown in detail in FIGS. 2–5. The base housing 30 includes a substantially cylindrical peripheral wall 44 and a substantially planar face member 46 at one end of the peripheral wall 44 adjacent the fastening rod 26. A slot 48 extends through the face member 46 with the slot 48 adapted to receive the elongate member 38 of the fastening rod 26 therethrough. The slot 48 is preferably formed of a circular center portion with a pair of diametrically opposed rectangular portions extending therefrom. The slot 48 has a length generally corresponding to the length of the elongate member 38. Additionally, a width of the rectangular portions of the slot 48 also generally corresponds to a width of the elongate member 38. The fastening rod 26 is adapted to be rotated to a secured position after receipt of the elongate member 38 through the slot 48 to secure the fastening rod 26 to the base housing 30. In the secured position, an example of which is shown in phantom and labeled B in FIG. 3, the elongate member 38 will overlap the face member 46.

Figure 4:
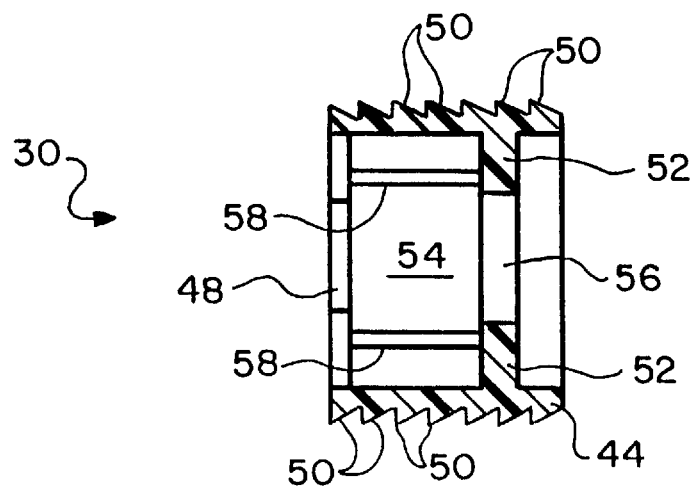
FIG. 4 is a sectional side view of the base housing illustrated in FIG. 2 taken along section 4—4.
Figure 5:
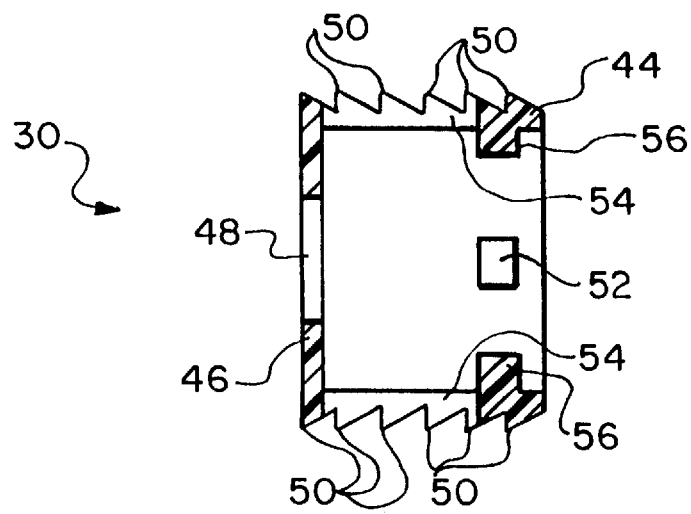
FIG. 5 is a sectional side view of the base housing illustrated in FIG. 2 taken along section 5—5.

As shown in FIGS. 1, 4 and 5, a plurality of radially outward extending annular serrations 50 is positioned on the peripheral wall 44. The annular serrations 50 assist in keeping the base housing 30 within the blind bore 32. The annular serrations 50 can assist in gripping the side walls of the bore 32 where only a friction fit is used and/or provide increased bonding area where adhesive is used to secure the base housing 30 within the blind bore 32.

The base housing 30 includes a pair of stop members 52 extending radially inward from the peripheral wall 44. Each stop member 52 is aligned with one of the rectangular portions of the slot 48. The stop members 52 provide an axial stop for when the elongate member 38 of the fastening rod 26 is moved through slot 48 preventing excessive advancement of the fastening rod 26.

The base housing 30 further includes a pair of diametrically opposed openings 54 in the peripheral wall 44 which is positioned on the base housing 30 approximately 90° offset from the orientation of slot 48. Each opening 54 is capable of receiving a portion of the elongate member 38 therein wherein the fastening rod 26 is in the secured position as will be described hereinafter. The base housing 30 further includes a pair of arcuate stopping ridges 56 extending radially inward from the peripheral wall 44. Each of the stopping ridges 56 is aligned with one opening 54 in the peripheral wall 44. The stopping ridges 56 are adapted to stop elongate member 38, thereby preventing extensive axial advancement of the fastening rod 26 when the fastening rod 26 is in the secured position.

Figure 3:
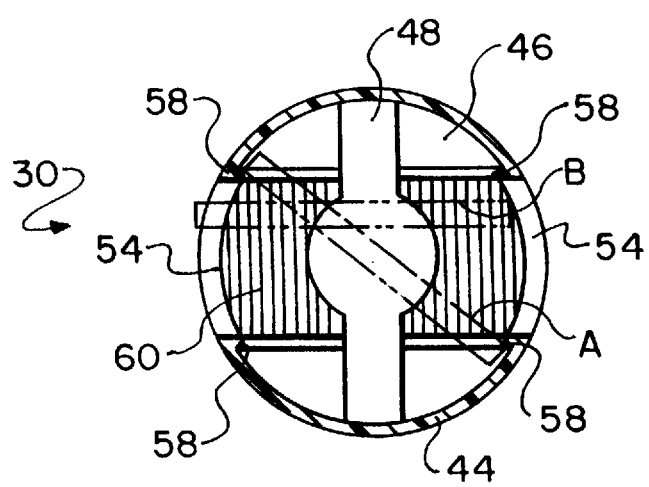
FIG. 3 is a sectional plan view of the base housing illustrated in FIG. 2.

The base housing 30 additionally includes a plurality of locking projections 58 extending radially inward from the peripheral wall 44. Each locking projection, best seen in FIG. 3, is generally triangular in cross section and extends from the face member 46 to one of the stopping ridges 56 adjacent a side edge of one of the openings 54 in the peripheral wall 44. The locking projections 58 are adapted to engage with the elongate member 38 to help maintain the fastening rod 26 within the secured position as will be described hereinafter.

The base housing 30 additionally includes a plurality of teeth members 60 on the face member 46 facing an opposite end of the base housing 30 generally into the blind bore 32. The teeth members 60 of the base housing 30 frictionally engage the teeth members 42 of the elongate member 38 when the fastening rod 26 is in the secured position and the tightening fastener 16 has positioned the fastener assembly 10 in a locked position as will be described hereinafter.

In operation, the base housing 30 is secured within the blind bore 32 of the drawer front 12 by a friction fit and/or adhesives. The elongate member 38 of the fastening rod 26 is moved through the slot 48, and the fastening rod 26 will be rotated to move the fastening rod 26 to a secured position, an example of which is shown in phantom and labeled B in FIG. 3. As shown in phantom in FIG. 3 and labeled A, the fastening rod 26 can be easily rotated until the elongate member 38 engages with diametrically opposed locking projections 58. The fastening rod 26 is then rotated until the elongate member 38 snaps past the locking projections 58 into the secured position as shown at B in FIG. 3. The base housing 30 is preferably formed of plastic or other appropriate material such that the locking projections 58 are elastically deformed to allow the movement of the elongate member 38 past the locking projections 58 and snapping into the secured position. In the secured position (B in FIG. 3 is one example of the secured position), the elongate member 38 will be maintained roughly aligned with the openings 54, and each opening 54 is capable of receiving one end of the elongate member 38 therein, if desired. The reduced diameter portion 40 of the fastening rod 26 is received within the circular portion of the slot 48 which, together with the receipt of portions for the elongate member 38 in openings 54, allows for relative adjustment in the relative final locked positions of the fastening rod 26 and associated drawer body 14 and the base housing 30 and associated drawer front 12 as will be appreciated by those of ordinary skill in the art. As discussed above, the stop members 52 prevent the fastening rod 26 from being inserted too far into the blind bore 32 during insertion of the elongate member 38 into the slot 48. Similarly, the stopping ridges 56 prevent the fastening rod 26 from being advanced too far into the blind bore 32 when the fastening rod 26 is in the secured position.

With the fastening rod 26 in the secured position, the head portion 34 is inserted through longitudinal bore 28 into the groove 20 of the tightening fastener 16 within bore 18. The tightening fastener 16 is rotated such that camming surfaces 22 will move the fastening rod 26 axially along the longitudinal length thereof pulling the elongate member 38 into tight engagement with the face member 46 to lock the drawer front 12 to the drawer body 14. The teeth members 42 and 60 will be engaged to assist in a secure locking arrangement. The relative movement of the fastening rod 26 relative to the base housing 30, with the fastening rod 26 in the secured position, allows the drawer front 12 to be appropriately orientated prior to rotation or tightening of the tightening fasteners 16 to lock the fastener assembly 10.

It will be appreciated by those of ordinary skill in the art that a plurality of fastener assemblies 10 will generally be utilized for securing a drawer front 12 to a drawer body 14. Typically, at least one fastener assembly 10 will be provided on each side, and for a large drawer front 12, multiple fastener assemblies 10 will be associated with each side of the drawer. It will be further obvious to those of ordinary skill in the art that various modifications may be made to the present invention without departing from the spirit and scope thereof. Consequently, the scope of the present invention is intended to be defined by the following claims.

What is claimed is:

1. A fastener assembly for releasably and adjustably coupling elements together, said fastener assembly comprising:

a fastening rod extending between the elements, said rod including an elongate member at one end thereof extending substantially transverse to a longitudinal length of said rod; and a base housing mounted within one of the elements, said base housing including a substantially cylindrical peripheral wall, a face member at one end of said cylindrical peripheral wall and extending substantially transverse to said longitudinal length of said rod, and a slot extending through said face member, said slot adapted to receive said elongate member therethrough, wherein said fastening rod is rotated to a secured position after receipt of said elongate member therethrough, wherein said elongate member overlaps said face member and said length of said rod is substantially parallel with a longitudinal axis of said cylindrical peripheral wall when said fastening rod is in said secured position.

2. The fastener assembly of claim 1 wherein said base housing further includes a pair of stop members extending radially inward from said peripheral wall, each said stop member spaced from said face member and aligned with a portion of said slot.

3. The fastener assembly of claim 1, wherein said base housing further includes a pair of diametrically opposed openings in said cylindrical peripheral wall, each said peripheral wall opening capable of receiving a portion of said elongate member therein when said fastening rod is in said secured position and wherein a diameter across said cylindrical peripheral wall connecting said Pair of openings extends across said slot in said face member.

4. The fastener assembly of claim 3 wherein said base housing further includes a pair of arcuate stopping ridges extending radially inward from said peripheral wall, each said stopping ridge aligned with one said peripheral wall opening.

5. The fastener assembly of claim 4 wherein said base housing further includes a plurality of locking projections extending radially inward from said peripheral wall, each said locking projection extending from said face member to one said stopping ridge adjacent a side edge of one said peripheral wall opening.

6. The fastener assembly of claim 5 wherein said slot includes a substantially circular center portion and a pair of diametrically opposed rectangular portions extending from said center portion.

7. The fastener assembly of claim 6 wherein said elongate member includes a plurality of teeth members on a surface thereof facing an opposite end of said fastening rod.

8. The fastener assembly of claim 7 wherein said base housing further includes a plurality of teeth members on said face member facing an opposite end of said base housing, wherein said teeth members of said base housing frictionally engage said teeth members of said elongate member when said fastening rod is in said secured position and said fastener assembly is coupling the elements together.

9. The fastener assembly of claim 8 wherein said base housing further includes a plurality of annular serrations on a radially outward extending surface of said peripheral wall.

10. A fastener assembly which is adapted for detachably and adjustably connecting a drawer front and a drawer body, said fastener assembly comprising:

a tightening fastener adapted to be rotatably positioned within the drawer body;

a fastening rod adapted to extend between the drawer body and the drawer front, said fastening rod including a head portion at one end thereof detachably connected to said tightening fastener, and a substantially T-shaped tail portion at an opposite end of said fastening rod; and a base housing adapted to be mounted within the drawer front, said base housing having a slot therein which receives said tail portion, said base housing including a peripheral wall extending in a longitudinal axis which is substantially Parallel with a longitudinal axis of said fastening rod, wherein said fastening rod is rotated relative to said base housing to a secured position to secure said fastening rod to said base housing after receipt of said tail portion within said slot, and in said secured position at least a portion of said tail portion overlaps a portion of said base housing.

11. The fastener assembly of claim 10 wherein said peripheral wall is a substantially cylindrical peripheral wall and said base housing includes a substantially planar face member at one end of said peripheral wall, said face member including said slot extending therethrough.

12. The fastener assembly of claim 11 wherein said slot includes a substantially circular center portion and a pair of diametrically opposed rectangular portions extending from said center portion.

13. The fastener assembly of claim 12 wherein said base housing further includes a pair of stop members extending radially inward from said peripheral wall, each said stop member spaced from said planar base member and aligned with one said rectangular portion of said slot.

14. The fastener assembly of claim 11, wherein said base housing further includes a pair of diametrically opposed openings in said cylindrical peripheral wall, each said peripheral wall opening capable of receiving a portion of said tail portion therein when said fastening rod is in said secured position and wherein a diameter across said cylindrical peripheral wall connecting said pair of openings extends across said slot in said face member.

15. The fastener assembly of claim 14 wherein said base housing further includes a pair of arcuate stopping ridges extending radially inward from said peripheral wall, each said stopping ridge aligned with one said peripheral wall opening.

16. The fastener assembly of claim 15 wherein said base housing further includes a plurality of locking projections extending radially inward from said peripheral wall, each said locking projection extending from said face member to one said stopping ridge adjacent a side edge of one said peripheral wall opening.

17. The fastener assembly of claim 11 wherein said tail portion includes a substantially rectangular elongate member extending transverse to said longitudinal axis of said fastening rod, wherein said elongate member includes a plurality of teeth members on a surface thereof facing said head portion.

18. The fastener assembly of claim 17 wherein said base housing further includes a plurality of teeth members on said face member facing an opposite end of said base housing, wherein said teeth members of said base housing frictionally engage said teeth members of said elongate member when said fastening rod is in said secured position and said tightening fastener has positioned said fastener assembly in a locked position.

* * * * *

UNITED STATES PATENT AND TRADEMARK OFFICE
CERTIFICATE OF CORRECTION

PATENT NO. : 5,823,700
DATED : October 20, 1998
INVENTOR(S) : Robert C. Poworoznek It is certified that error appears in the above-identified patent and that said Letters Patent is hereby corrected as shown below:

Column 1 Line 52 "f or" should read --for--.

Claim 3 Column 5 Line 48 "said Pair" should read --said pair--.

Claim 10 Column 6 Line 26 "Parallel" should read --parallel--.

Signed and Sealed this

Thirtieth Day of March, 1999

Attest:

Attesting Officer

Q. TODD DICKINSON

Acting Commissioner of Patents and Trademarks